GEORGE GIBBS & WILLIAM GIBBS.

Improvement in Whiffletrees.

No. 4,647. Reissued Nov. 28, 1871.

A. Merriley
Andrew Choffin } Witnesses.

George Gibbs
William Gibbs } Inventors
by Job Abbott Attorney.

AM. PHOTO-LITHOGRAPHIC CO. N.Y. (OSBORNE'S PROCESS.)

UNITED STATES PATENT OFFICE.

GEORGE GIBBS AND WILLIAM GIBBS, OF CANTON, OHIO.

IMPROVEMENT IN WHIFFLETREES.

Specification forming part of Letters Patent No. 75,308, dated March 10, 1868; reissue No. 4,647, dated November 28, 1871.

*To all whom it may concern:*

Be it known that we, GEORGE GIBBS and WILLIAM GIBBS, both of Canton, Stark county, Ohio, have invented certain new and useful Improvements in Single and Double-Trees; and that the following is a full, clear, and exact specification thereof, which will enable others skilled in the art to make and use the said invention.

Our invention relates to an improved construction of what are known as spring whiffletrees, either in the form of single-trees for one horse, or in the form of double-trees for two or more horses; the object of this construction being to obtain a spring draft for the team, so that the sudden strains due to the violent efforts of the team, or to obstructions to the movement of the load, will not be liable to break the draft attachments on the one hand or to jerk and injure the horses or the occupants of the vehicle on the other; and a further object being to allow the draft to act gradually on the load, in order to prevent the team from balking in starting a heavy load, as they will sometimes do when the whole load must be started as a dead load, as in the ordinary case of non-elastic draft. The first part of said invention consists in the combination of a pair of elastic spring-arms with the ends of a non-elastic draft-bar, the said parts being so connected as to receive the draft of the team at the free ends of said elastic spring-arms, and to transfer it to the load from the central portion of the draft-bar, so that said elastic spring-arms act between the draft and the load and thus give a spring draft to the team, as is hereinafter more fully shown. The second part of said invention consists in the combination of an indicator with the draft-bar having the elastic spring-arms at its ends, and with the draft-links or connections by which the draft of the team is applied to the ends of the elastic spring-arms, said draft-links or connections having suitable indexes made on them, so as to indicate, by the position of the index-marks with respect to the indicator, the amount of draft being applied by the team.

Figure 1:
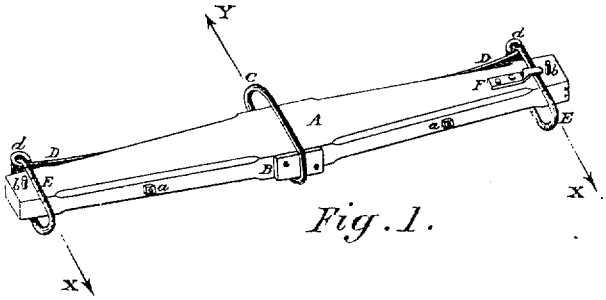
Figure 2:
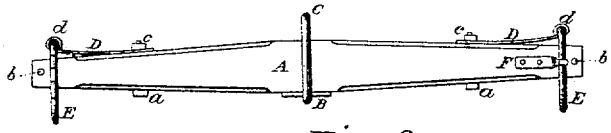
Figure 3:
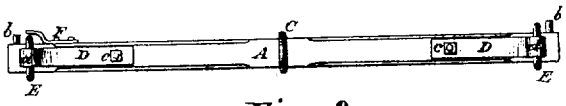
Figure 4:
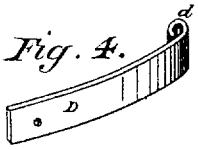
Figure 5:
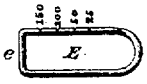
Figure 6:
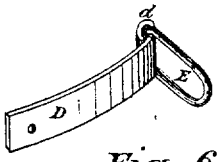

In the accompanying drawing, Figure 1 is a perspective view of a double-tree embodying our invention. Fig. 2 is a plan of the same. Fig. 3 is a rear elevation of the same. Figs. 4 and 5 are views of the elastic spring-arm and its draft-link, taken separately. Fig. 6 is a perspective view of these parts as they appear together before being attached to the draft-bar.

A represents the draft-bar, which is usually made of wood, and which is of the proper length and size for the single or double tree required. B is a face plate which forms a bearing for the loop C, by which the draft is applied to the load. D D are the elastic spring-arms, which are made of steel plates of such length and section as to give the required elasticity and strength for the required single or double tree, which dimensions, as well as the particular manner of building up the spring in case of heavy draft, are matters to be determined by the judgment of the constructor in meeting the requirement of any particular case. These spring-arms D D are conveniently secured to the rear face of the draft-bar A by bolts *a a*, which are run through the draft-bar and the rear ends of the arms and are secured by nuts *c*, as shown. When thus secured to the draft-bar their outer ends *d* stand back from the bar, as shown in Figs. 1 and 2, so that if the draft be applied to the ends of said arms, as indicated by arrows *x x* in Fig. 1, their elasticity will be brought into play before the draft reaches the draft-bar A, and is applied to overcome the resistance of the load indicated by the arrow F, thus obtaining the elastic or spring draft under all circumstances, which is the object of the spring whiffletree.

As a means of applying the draft to the ends of the arms D, the draft-links E are welded up like a ring and bent into the form shown in Fig. 5, and the eye *d* on the end of the spring-arm D is then turned around the straight side *e* of the link E, thus uniting the arm and link by a pivot-joint connection, as shown in Fig. 6. The spring-arm D is then bolted to the draft-bar A, as before shown, when the link E encircles the end of the draft-bar and thus forms a convenient point of attachment for the draft, the pin *b* being driven into the draft-bar D after the link E is turned over its end in order to prevent said link from swinging off from the bar, if found necessary.

It is sometimes found desirable to ascertain the amount of draft being applied by the team, and for this purpose the indicator F may be secured on the draft-bar A with its point over the link E, and marks indicating fifty, one hundred, one hundred and fifty, or any other number of pounds within the capacity of the spring-arms D may be made on the links E, by applying weights of known amounts to the links E and marking the position of the indicator-point F on said links when under such loads, in which case a like amount of draft will be indicated by a similar position of the link E under the indicator F.

Among the advantages resulting from this plan of construction may be mentioned the saving in cost, by the use of the non-elastic draft-bar as the central portion, of the complete single or double-tree with the steel spring-arms at the ends only, instead of using a steel spring for the whole length of the tree, which is an important consideration, especially in double-trees, where a spring of sufficient length and strength would be heavy and expensive. It will also be noted that the use of the flat-bar spring in one or more leaves in the form of arms at the end of the double-tree is much preferable to the use of a flat-bar spring as a bearing for the central draft-link, as in the first case, if one of the horses starts suddenly, the strain thus produced is received first by the spring-arm to which the horse is attached, and is then transferred by the lever action of the draft-bar through the other spring-arm to the other horse, thus breaking its force by the elasticity of both arms before it can possibly jerk and injure the other horse, while in the latter case the draft-bar acts as a rigid lever in transferring the strain from one horse to the other and the central spring acts simply as a movable fulcrum; or, to put the case in another form, the draft of the horse at rest or moving at an ordinary rate represents the resistance of a fixed fulcrum, and the sudden strain due to the other horse acts on the rigid draft-bar as a lever to compress the central spring, and it is evident that a very quick motion of one horse cannot fail to affect the other horse much more directly and forcibly than in the first case.

We do not claim the use of tubular or spiral springs at the ends of the draft-bar; nor do we claim the use of non-elastic arms at the ends of the draft-bar, bearing on springs on said bar; nor do we claim the use of a single or double tree consisting of a bar-steel spring of one or more leaves extending from one point of draft attachment to the other without the intervention of a non-elastic draft-bar; nor do we claim the use of a bar-steel spring as the central draft bearing of a rigid draft-bar to which the direct draft is applied at the ends, as these features have been before shown.

What we claim as our invention, and desire to secure by Letters Patent, is—

1. The combination of a pair of disconnected steel spring-arms with the ends of a non-elastic draft-bar, said draft-bar with its spring-arms being arranged to turn on a central bearing, and being used with respect to the direct draft and the resistance of the load, substantially as is herein specified.

2. A bar-steel spring-arm for a draft-bar having an open draft-link secured in a turned eye at its end, substantially as and for the purpose herein specified.

3. The combination of a non-elastic draft-bar and two steel spring-arms having open draft-links secured in turned eyes at their ends, said arms being arranged at the ends of said draft-bar, and said draft-bar being arranged to turn on a central bearing, substantially as and for the purpose specified.

4. In combination, with a draft-link secured in the end of a spring-arm on the end of a draft-bar, and encirling the end of said bar, a stop-pin or projection in the draft-bar for preventing said link from being swung off from said draft-bar, substantially as is herein specified.

5. In combination with a draft-link or connection at the end of a spring-arm for a draft-bar, a scale of indexes marked on said link, and an indicator secured on the draft-bar for the purpose of showing the amount of draft applied by the team, substantially as is herein specified.

As evidence of the foregoing witness our hands this 11th day of August, A. D. 1871.

GEORGE GIBBS.
WILLIAM GIBBS.

Witnesses:
JOB ABBOTT,
ANDREW CHOFFIN.

(31)